July 7, 1964    R. O. WELTY    3,139,848
FLUID DISTRIBUTION
Filed June 22, 1962    2 Sheets-Sheet 1

INVENTOR.
R. O. WELTY
BY
*Young & Quigg*
ATTORNEYS

INVENTOR.
R.O. WELTY

BY Young + Quigg

ATTORNEYS

United States Patent Office 3,139,848
Patented July 7, 1964

3,139,848
FLUID DISTRIBUTION
Richard O. Welty, Bartlesville, Okla., assignor to Phillips Petroleum Company, a corporation of Delaware
Filed June 22, 1962, Ser. No. 204,425
3 Claims. (Cl. 111—7)

This invention relates to means for distributing fluid. In one aspect the invention relates to a means for distributing fluid from one source to a plurality of outputs. In another aspect the invention relates to means for distributing fluid having both a liquid and gas phase. In a still further aspect the invention relates to means for distributing ammonia. In yet another aspect the invention relates to means for providing even distribution of liquid ammonia for injection into the ground.

It is well known that anhydrous ammonia applied directly to the soil is an effective fertilizer. Equipment has been designed and constructed for the application of the ammonia and generally comprises a wheeled vehicle, such as a trailer, having a liquid ammonia storage tank mounted thereon, a metering pump having the inlet thereof connected to the storage tank, a plurality of shoes or colters mounted on the vehicle and adapted to produce a furrow in the ground as the vehicle is moved forward, and a conduit connected to the output of the pump and having a plurality of branch conduits going to a point near the bottom of the respective shoes or colters. However, as the ammonia flows through such a system, pressure drops occur resulting in the vaporization of part of the ammonia. Difficulties have been encountered in attempting to obtatin even distribution of the ammonia when it is in both liquid and gas phases.

Where it is desired to divide a first stream into two streams these difficulties can be overcome in accordance with a first embodiment of the invention by introducing the first stream tangentially into a cylindrical chamber in such a manner as to subject the stream to centrifugal forces which are large compared to the gravitation force tending to separate the liquid and gas phases, and withdrawing the fluid through two restricted passageways, which are preferably located substantially coaxial with said cylindrical chamber.

Where it is desired to divide a first stream into a plurality of streams, these difficulties can be overcome in accordance with a second embodiment of the invention by introducing the first stream into a chamber having a cylindrical wall and where the height ($h$) of the chamber decreases as the distance ($r$) from the axis of the chamber so that the product $2\pi rh$ remains substantially constant, thus providing a substantially constant flow area for the fluid as it passes through the chamber to maintain the fluid under high velocities and thus high inertial forces, and withdrawing the fluid from the chamber through a plurality of restricted passageways into a plurality of output passageways. In a preferred embodiment of this second embodiment, the restricted passageways are disposed in a removable member so that the size of the restricted passageways can be readily changed as desired.

Accordingly it is an object of the invention to provide means for dividing a stream into two or more equal streams. Another object of the invention is to provide even distribution of a fluid having both liquid and gas phases. Another object of the invention is to provide improved means for introducing ammonia into the ground in substantially equal streams. Still another object of the invention is to provide means for dividing a fluid stream into two or more substantially equal output streams despite variations in factors affecting the individual output streams, such as variations in the length of travel.

Other aspects, objects and the several advantages of the invention will be apparent from a study of the disclosure, the drawings, and the appended claims to the invention.

Referring now to the drawings.

Figure 1:
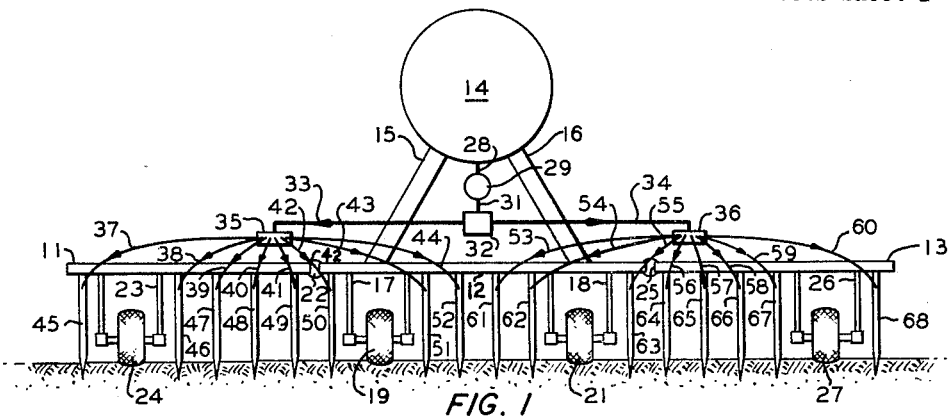
FIGURE 1 is an elevation view of a liquid ammonia fertilizer applicator embodying the fluid distributors of the present invention.

Referring now to the drawing and to FIGURE 1 in detail there is disclosed an ammonia applicator comprising frame sections 11, 12 and 13, and an ammonia tank 14 positioned on frame section 12 by means of supports 15 and 16. Frame section 12 is supported by means of wheel frames 17 and 18 together with wheels 19 and 21, respectively. One end of frame section 11 is pivotally secured to frame section 12 by means of pivot 22 while the other end of frame section 11 is supported by means of wheel frame 23 together with wheel 24. One end of frame section 13 is pivotally secured to one end of frame section 12 by means of pivot 25 while the other end of frame section 13 is supported by means of wheel frame 26 together with wheel 27. Liquid ammonia is withdrawn from tank 14 by means of conduit 28 and metering pump 29 and passed through conduit 31 into the inlet of fluid distributor 32. Conduits 33 and 34 connect the two outlets of fluid distributor 32 to the inlets of fluid distributors 35 and 36, respectively. A first plurality of conduits 37–44 connect the outlets of fluid distributor 35 to a point near the bottom of respective ones of shoes 45–52. A second plurality of conduits 53–60 connect the outlets of fluid distributor 36 to a point near the bottom of respective ones of a second plurality of shoes 61–68. Suitable means (not shown) can be utilized for providing motor power for the vehicle.

Figure 3:
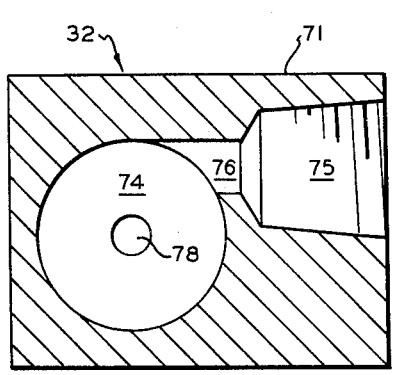
FIGURE 3 is a sectional view taken on the line 3—3 of FIGURE 2.
Figure 2:
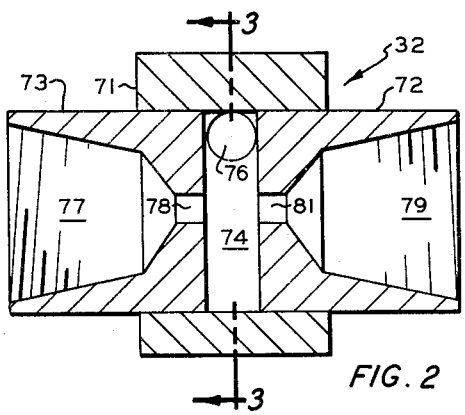
FIGURE 2 is a sectional view of a fluid distributor in accordance with a first embodiment of the invention.

Referring now to FIGURES 2 and 3 fluid distributor 32 comprises a body made up of members 71, 72 and 73 to form a cylindrical chamber 74 therein. A fluid inlet passageway is disposed in member 71 and comprises an inlet passageway 75 and a restricted passageway 76 with the restricted passageway 76 communicating between inlet passageway 75 and cylindrical chamber 74. The fluid inlet passageway is substantially tangential to cylindrical chamber 74 with the axis of restricted portion 76 being substantially perpendicular to a plane containing the axis of cylindrical chamber 74. In the preferred embodiment the wall of restricted passageway 76 farthest from the axis of cylindrical chamber 74 is disposed substantially tangentially to the inner wall of cylindrical chamber 74. A first outlet passageway 77 is disposed in member 73 with a restricted passageway 78 communicating between cylindrical chamber 74 and outlet passageway 77. A second outlet passageway 79 is disposed in member 72 with another restricted passageway 81 communicating between cylindrical chamber 74 and outlet passageway 79. Restricted passageways 78 and 81 are of equal cross-sectional area and substantially coaxial with the axes thereof substantially parallel to the axis of cylindrical chamber 74 in order to provide for equal flow therethrough. In a preferred embodiment restricted passageways 78 and 81 are coaxial with cylindrical chamber 74. Members 72 and 73 can be joined to member 71 by any suitable means such as screw threads, bayonet joints, or welded joints.

Elements 71, 72 and 73 can be made out of any suitable material, for example, steel.

The introduction of the fluid through restricted passageway 76 tangentially into cylindrical chamber 74 creates a vortex and subjects the fluid to tangential forces which are large compared to the gravitational force tending to separate the liquid and gas phases of the fluid. While restricted passageways 78 and 81 aid in forming the ends of cylindrical chamber 74, the primary function of restricted passageways 78 and 81 is to form a restriction such that small differences in resistance to flow in the remaining portion of the outlet systems will be negligible compared to the flow resistance of restricted passageways 78 and 81 with the result that the flow will be divided substantially equal between outlet passageway 77 and 79 despite any pressure differences in the outlet systems downstream of restricted passageways 78 and 81.

Figure 4:
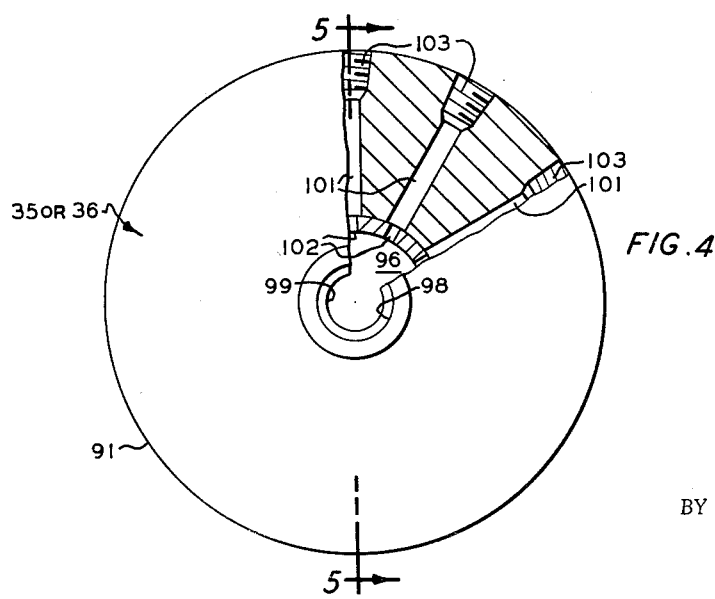
FIGURE 4 is a plan view, partly in section, of a fluid distributor in accordance with a second embodiment of the invention.
Figure 5:
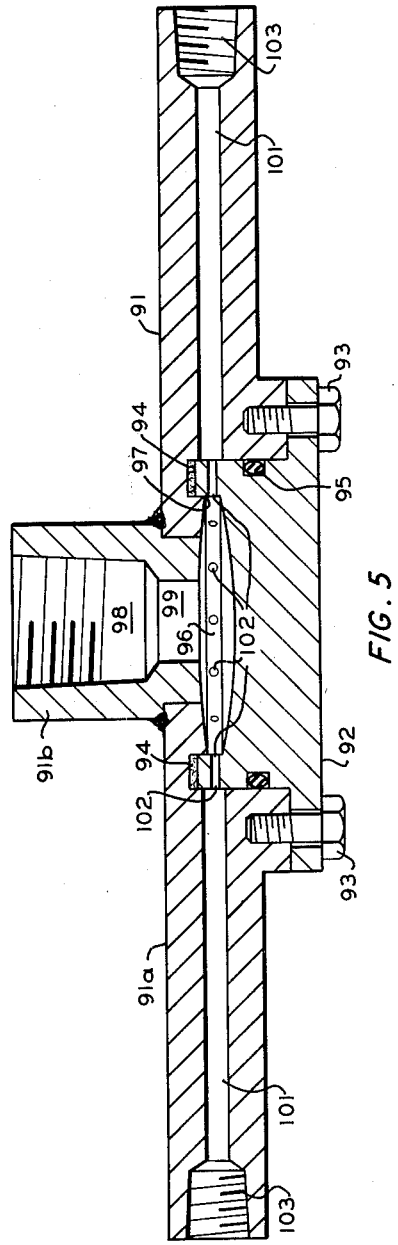
FIGURE 5 is a sectional view taken along line 5—5 of FIGURE 4.

Referring now to FIGURES 4 and 5, fluid distributor 35 (as well as fluid distributor 36) comprises a body made up of a first member 91 and a second member 92. Member 92 is removably secured to member 91 by means of any suitable means such as bolts 93. A ring gasket 94 and O-ring 95 are provided to form a fluid tight relationship between elements 91 and 92. When connected together elements 91 and 92 form a chamber 96 having a cylindrical wall 97. A fluid inlet passageway comprising inlet passageway 98 and restricted passageway 99 is disposed in member 91 and communicates between conduit 33 (or conduit 34 in the case of fluid distributor 36) and chamber 96. The height ($h$) of chamber 96 decreases as the distance ($r$) from the axis of said chamber increases so that the product $2\pi rh$ remains substantially constant for values of $r$ greater than the radius of restricted passageway 99 to provide a substantially constant flow area for the fluid as it passes through the chamber and thus maintain the fluid flow at a high velocity so that the inertial forces of the fluid movement will be substantially greater than the gravitational forces tending to separate the liquid and gas phases of the fluid. Restricted passageway 99 and chamber 96 are substantially coaxial to provide for even distribution of the fluid flow. Member 91 contains a plurality of outlet passageways 101 radially disposed therein with respect to the axis of chamber 96 and at substantially equal intervals. Member 92 contains a plurality of restricted passageways 102 disposed radially therein with respect to the axis of chamber 96 and at substantially equal intervals and communicating between chamber 96 and respective ones of outlet passageways 101. If desired, each outlet passageway 101 can have an enlarged section 103 at the outer end thereof. Inlet passageway 98 and sections 103 can be provided with any suitable means for connection thereof to the pipe system, for example screw threads. If desired, member 91 can be made in two or more pieces 91a and 91b for ease in machining. Pieces 91a and 91b can be joined by any suitable means, for example, by screw threads or welding. Members 91 and 92 can be made of any suitable material, for example, steel. In a preferred embodiment element 92 is readily removable from element 91 so that similar elements having different cross-sectional areas for restricted passageways 102 can be utilized as desired.

Reasonable variation and modification are possible within the scope of the foregoing disclosure, the drawing and the appended claims to the invention.

I claim:

1. A fluid distribution apparatus comprising first and second members adapted to be connected together to form a cylindrical chamber, means removably connecting said first and second members together in fluid tight relationship, a fluid inlet passageway disposed in said first member and communicating with said chamber, the height ($h$) of said chamber decreasing as the distance ($r$) from the axis of said chamber increases so that the product $2\pi rh$ remains substantially constant for values of $r$ greater than the radius of said fluid inlet passageway, said fluid inlet passageway and said chamber being substantially coaxial, a plurality of outlet passageways radially disposed in said first member with respect to the axis of said chamber at substantially equal intervals, and a plurality of restricted passageways radially disposed in said second member with respect to the axis of said chamber at substantially equal intervals and communicating between said chamber and respective ones of said plurality of outlet passageways.

2. A dispensing system for the direct application of ammonia to soil comprising, in combination, a wheeled vehicle;

first and second plurality of shoes supported by said vehicle, said shoes being adapted to produce furrows in the ground as the vehicle is moved forward;

a liquid ammonia storage tank mounted on said vehicle;

a first fluid distributor comprising a body having a cylindrical chamber therein, a fluid inlet passageway disposed in said body and communicating with said cylindrical chamber, the wall of said fluid inlet passageway furthest from the axis of said cylindrical chamber being substantially tangential to the inner wall of said cylindrical chamber, the axis of said fluid inlet passageway being substantially perpendicular to a plane containing said axis of said cylindrical chamber, first and second outlet passageways located in said body, a first restricted passageway disposed in said body and communicating between said cylindrical chamber and said first outlet passageway, a second restricted passageway disposed in said body and communicating between said cylindrical chamber and said second outlet passageway, said first and second restricted passageways being substantially coaxial with said cylindrical chamber;

first conduit means communicating between said liquid ammonia storage tank and said fluid inlet passageway of said first fluid distributor;

second and third fluid distributors each having an inlet and a plurality of outlets;

second conduit means communicating between said first outlet passageways of said first fluid distributor and the inlet of said second fluid distributor;

third conduit means communicating between said second outlet passageway of said first fluid distributor and the inlet of said third fluid distributor;

a first plurality of conduits communicating between the individual outlets of said second fluid distributor and points near the bottom of respective ones of said first plurality of shoes; and a second plurality of conduits communicating between the individual outlets of said third fluid distributor and points near the bottom of respective ones of said second plurality of shoes.

3. Apparatus in accordance with claim 2 wherein said second and third fluid distributors each comprises first and second members adapted to be connected together to form a second chamber having a cylindrical wall means for removably connecting said first and second members together in fluid tight relationship, a second fluid inlet passageway disposed in said first member and communicating with said second chamber, the height ($h$) of said second chamber decreasing as the distance ($r$) from the axis of said second chamber increases so that the product $2\pi rh$ remains substantially constant for values of $r$ greater than the radius of said second fluid inlet passageway, said second fluid inlet passageway and said second chamber being substantially coaxial, a plurality of outlet passageways radially disposed in said first member with respect to the axis of said second chamber at substantially equal intervals, and a plurality of restricted passageways radially disposed in said second member with respect to the axis of said second chamber at substantially equal intervals and communicating between said second chamber and respective ones of said plurality of outlet passageways.

References Cited in the file of this patent

UNITED STATES PATENTS

| | | |
|---|---|---|
| 1,654,381 | Murphy | Dec. 27, 1927 |
| 2,450,599 | Kloda | Oct. 5, 1948 |
| 2,484,577 | Murphy | Oct. 11, 1949 |
| 2,536,832 | Altorfer | Jan. 2, 1951 |
| 2,550,573 | Lyman | Apr. 24, 1951 |
| 2,650,556 | Turner | Sept. 1, 1953 |
| 2,650,860 | Carr | Sept. 1, 1953 |
| 2,828,597 | Moore | Apr. 1, 1958 |

FOREIGN PATENTS

| | | |
|---|---|---|
| 194,571 | Austria | Jan. 10, 1958 |
| 704,661 | Great Britain | Feb. 24, 1954 |